United States Patent
Penny

(10) Patent No.: US 8,308,002 B2
(45) Date of Patent: *Nov. 13, 2012

(54) PREFORM AND CONTAINER HAVING THREAD GROOVE OF VARYING DEPTH

(75) Inventor: Michael E. Penny, Saline, MI (US)

(73) Assignee: Amcor Limited, Hawthorn (AU)

( * ) Notice: Subject to any disclaimer, the term of this patent is extended or adjusted under 35 U.S.C. 154(b) by 261 days.

This patent is subject to a terminal disclaimer.

(21) Appl. No.: 12/648,462

(22) Filed: Dec. 29, 2009

(65) Prior Publication Data

US 2010/0270255 A1 Oct. 28, 2010

Related U.S. Application Data

(63) Continuation-in-part of application No. 11/698,009, filed on Jan. 25, 2007, now Pat. No. 7,918,356.

(60) Provisional application No. 60/763,203, filed on Jan. 27, 2006.

(51) Int. Cl.
*B65D 1/02* (2006.01)
*B65D 41/34* (2006.01)

(52) U.S. Cl. .......... 215/44; 220/288; 428/542.8

(58) Field of Classification Search .......... 215/42, 215/44, 40, 43, 45; 220/288; 428/542.8
See application file for complete search history.

(56) References Cited

U.S. PATENT DOCUMENTS

| | | |
|---|---|---|
| 3,497,096 A | 2/1970 | Smith et al. |
| 3,757,487 A | 9/1973 | Fauth |
| 4,005,799 A | 2/1977 | Mannaerts |
| 4,257,526 A | 3/1981 | Weits et al. |
| 4,373,641 A | 2/1983 | Banich et al. |
| 4,730,747 A | 3/1988 | Schiemann |
| 4,895,265 A | 1/1990 | Luch et al. |
| 4,896,782 A | 1/1990 | Hawkins et al. |
| 4,993,571 A | 2/1991 | Conti |
| 5,533,633 A | 7/1996 | King |
| 5,702,014 A | 12/1997 | Nielsen |
| 5,845,798 A | 12/1998 | Carrier |
| 6,415,935 B1 | 7/2002 | Hins |

(Continued)

FOREIGN PATENT DOCUMENTS

DE 3916797 12/1989

(Continued)

OTHER PUBLICATIONS

English translation of Office Action dated Nov. 25, 2011 in corresponding Japanese Patent Application No. 2008-552418 (five pages).

(Continued)

*Primary Examiner* — Sue Weaver
(74) *Attorney, Agent, or Firm* — Harness, Dickey & Pierce, P.L.C.

(57) ABSTRACT

A finish for a plastic container and a preform adapted to be molded into the plastic container. The finish and the preform include an upper portion having a mouth defining an opening into the container. At least one groove is defined around a radial sidewall of the upper portion. The groove slopes gradually downward along the radial sidewall to a terminal end having a first groove depth at a groove entrance and a second groove depth after a predetermined amount of groove travel. The second groove depth being greater than the first groove depth.

22 Claims, 9 Drawing Sheets

U.S. PATENT DOCUMENTS

| | | | |
|---|---|---|---|
| 6,471,909 B1 | 10/2002 | Czesak | |
| 6,561,369 B1 | 5/2003 | Clodfelter et al. | |
| 6,841,117 B1 | 1/2005 | Smith et al. | |
| 6,989,124 B2 | 1/2006 | Miller et al. | |
| 7,207,451 B2 | 4/2007 | Taylor et al. | |
| 7,455,914 B2 | 11/2008 | Bromley et al. | |
| 7,531,125 B2 | 5/2009 | Dygert et al. | |
| 7,918,355 B2 * | 4/2011 | Penny | 215/44 |
| 7,918,356 B2 * | 4/2011 | Penny | 215/44 |
| 2005/0067365 A1 * | 3/2005 | Hanafusa et al. | 215/43 |
| 2005/0205575 A1 | 9/2005 | Kobayashi et al. | |
| 2005/0263476 A1 * | 12/2005 | Harrison et al. | 215/44 |
| 2007/0175854 A1 | 8/2007 | Penny | |
| 2007/0175855 A1 | 8/2007 | Penny | |

FOREIGN PATENT DOCUMENTS

| | | |
|---|---|---|
| FR | 2631932 | 12/1989 |
| JP | 11-222217 | 8/1999 |
| JP | 2000-326998 | 11/2000 |
| JP | 2003-339822 | 12/2003 |
| JP | 2004-035036 | 2/2004 |
| JP | 2005-001677 | 1/2005 |
| JP | 2005-170475 | 6/2005 |
| JP | 2005-212872 | 8/2005 |
| WO | WO 9100220 | 1/1991 |
| WO | WO 9422734 | 10/1994 |
| WO | WO 03057583 | 7/2003 |
| WO | WO 2004041669 | 5/2004 |
| WO | WO 2005097610 | 10/2005 |
| WO | WO 2007089552 | 8/2007 |
| WO | WO 2007089566 | 8/2007 |

OTHER PUBLICATIONS

Official Action dated Jun. 29, 2012 in corresponding Japanese Patent Application No. 2008-552418 and English translation of same (eight pages).

* cited by examiner

PREFORM AND CONTAINER HAVING THREAD GROOVE OF VARYING DEPTH

CROSS-REFERENCE TO RELATED APPLICATIONS

This application is a continuation-in-part of U.S. patent application Ser. No. 11/698,009 filed Jan. 25, 2007, now U.S. Pat. No. 7,918,356, issued Apr. 5, 2011. U.S. patent application Ser. No. 11/698,009 claims a benefit of U.S. Provisional Patent Application No. 60/763,203 filed on Jan. 27, 2006. The entire disclosures of each of the above applications are incorporated herein by reference.

TECHNICAL FIELD

This disclosure generally relates to plastic containers for retaining a commodity, and in particular a liquid commodity. More specifically, this disclosure relates to a plastic preform and resultant container having a groove formed in the molded surface where threads of a given closure will ride during capping.

BACKGROUND

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

Typically, an upper portion of the plastic container defines an opening. This upper portion is commonly referred to as a finish and includes some means for engaging a cap or closure to close off the opening. In the traditional injection-stretch blow molding process, the finish remains substantially in its injection molded state while the container body is formed below the finish. The finish may include at least one thread extending radially outwardly around an annular sidewall defining a thread profile. In one application, a closure member or cap may define a complementary thread, or threads, that are adapted to cooperatively mate with the threads of the finish. Generally, clockwise rotation of the cap encourages an upper surface of the cap threads to be retained by lower surfaces of the threads on the finish. In some applications, however, external thread profiles formed on the finish may require a non-desirable large amount of material to manufacture.

SUMMARY

Accordingly, the present disclosure provides a finish for a plastic container including an upper portion having a mouth defining an opening into the container. At least one groove is defined around a radial sidewall of the upper portion. The groove slopes gradually downward along the radial sidewall and away from the opening.

A preform adapted to be molded into a plastic container includes an upper portion having a mouth defining an opening into the container. The preform includes at least one groove defined around a radial sidewall of the upper portion. The groove slopes gradually downward along the radial sidewall to a terminal end.

A closure member is adapted to selectively mate with a finish on a container. The closure member includes a lower portion defining an opening and an upper portion defining a cover. At least one thread is formed on an inner surface of a radial sidewall extending between the lower portion and the upper portion.

Additional benefits and advantages of the present disclosure will become apparent to those skilled in the art to which the present disclosure relates from the subsequent description and the appended claims, taken in conjunction with the accompanying drawings.

DETAILED DESCRIPTION

Figure 1:
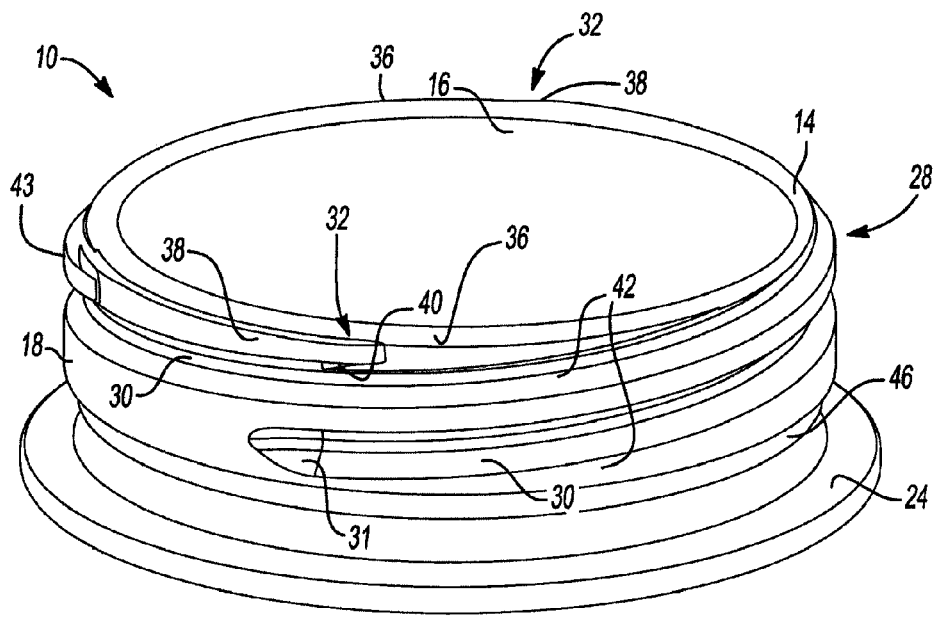
FIG. 1 is a perspective view of a finish of a plastic container constructed in accordance with the teachings of the present disclosure.

The following description is merely exemplary in nature, and is in no way intended to limit the disclosure or its application or uses.

This disclosure provides for a container finish having a significantly reduced weight, while enhancing the interface between a closure member or cap and the container, and meeting filling line temperature and speed demands. Significant weight reductions are achieved through the elimination of material from the container wall of a standard thread profile as well as the elimination of material in other areas of the finish, which represent areas where plastic can be removed without negatively affecting the sealability function of the closure member or cap and the container.

Additionally, a by-product of the disclosed container finish is an improvement to closure function. In this regard, the disclosed finish may be less damaging to frangible connectors incorporated in tamper-evidence closures, reducing the potential for premature closure/tamper-evidence band separation during application. The smoother, more cylindrical finish disclosed provides an opportunity to keep an applied closure member or cap more concentric with the finish, reducing the potential for uneven loading on the frangible connectors which secure the tamper-evidence band to the body of the closure member or cap. Such stability improves tamper-evidence band separation.

Traditionally, the distance between the top seal surface of a container and the start of the container's threads varies slightly during normal production. As this distance varies, it affects the rotational position of an applied closure, and thus the relative location of the tamper-evidence band retention features to the mating features on the finish. The disclosed container finish eliminates the above-mentioned distance and variability, and thereby contributes to improved tamper-evidence band closure performance.

With initial reference to FIGS. 1-4, a finish of a plastic, e.g. polyethylene terephthalate (PET), hot-fillable container is shown and generally identified at reference numeral 10. A closure member or cap 12 (FIG. 9, described in detail later) may be used to selectively mate with the finish 10 in a closed or assembled position. The finish 10 of the present teachings includes a top 14 defining a mouth or opening 16, an annular sidewall 18 and a support ring 24. The opening 16 allows the plastic container to receive a commodity. The annular sidewall 18 generally defines a groove region 28. The groove region 28 provides a means for attachment of the closure member or cap 12. The groove region 28 is formed by a pair of grooves 30 generally defining a helical pattern. Each groove 30 initiates at a groove entrance 32 and sweeps gradually downward about 180 degrees to about 220 degrees around the annular sidewall 18 of the finish 10 to a terminal end 31. Accordingly, the terminal end 31 prevents over torquing of the closure member or cap 12, which could compromise the seal integrity of the closure member or cap 12 and the container. The terminal end 31 also aids in orienting the closure member or cap 12 in relation to the container.

The groove entrance 32 is generally defined at an intersection between an inward sweeping radial lip 36 and an outward sweeping radial lip 38. As best illustrated in FIG. 2, the inward sweeping radial lip 36 defines an arcuate path having a decreasing radius in the clockwise direction. The outward sweeping radial lip 38 defines an arcuate path having an increasing radius in the clockwise direction. A ramp 40 (FIG. 1) is defined at the groove entrance 32 and leads into the respective grooves 30. In another example, the top 14 may define a constant outer radius without incorporating the inward and outward sweeping radial lips 36 and 38, respectively. It is appreciated that a single groove, or two or more grooves may be provided on the annular sidewall 18. Lands 42 define surfaces formed between the grooves 30 on the annular sidewall 18. A radial channel 46 having a stepped portion 49 is formed between the annular sidewall 18 and the support ring 24. As will be described in greater detail later, the radial channel 46 may serve as a means for capturing a break-away, tamper-evidence (TE) band 47 attached to the closure member or cap 12. It is appreciated that the radial channel 46 may also include notches, ratchets or similar geometry for dislodging the break-away, TE band 47 of the closure member or cap 12 during the opening of the container. In another example, the grooves 30 can extend all the way into the radial channel 46 effectively eliminating any terminal end of the grooves 30 (i.e. terminal end 31 discussed above).

Figure 2:
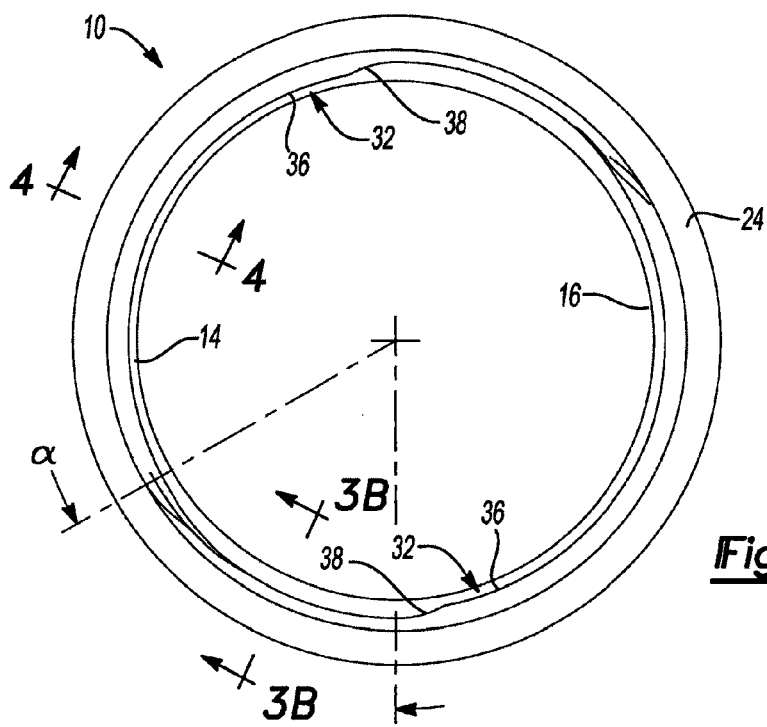
FIG. 2 is a top plan view of the finish of FIG. 1.

As shown in FIG. 1, starting at the top 14 of the finish 10, two separate outwardly protruding diametrical steps are created as the groove 30 follows its helical path downward around the annular sidewall 18 of the finish 10. The first outwardly protruding diametrical step, outward sweeping radial lip 38, sweeps gradually downward and extends radially around the annular sidewall 18 of the finish 10 between about 30 degrees to about 120 degrees in length. The second outwardly protruding diametrical step is defined by an outwardly stepped portion 43. The outwardly stepped portion 43 equates to the full depth of the grooves 30 and extends continually radially the remaining entire length of the grooves 30. As such, the outward sweeping radial lip 38 softly transitions into the outwardly stepped portion 43. The outwardly stepped portion 43 improves the overall strength of the outward sweeping radial lip 38 and improves the overall manufacturability of a container having the finish 10. The outward sweeping radial lip 38 in combination with the outwardly stepped portion 43 ensures the protection of the top 14 of the finish 10. The outward transition of the outwardly stepped portion 43 creates greater depth in the grooves 30. Said differently, the grooves 30 have more depth or are deeper at the outwardly stepped portion 43. As shown in FIGS. 1-4, the groove depth of the grooves 30 is increased from the onset of the grooves 30 for the first a degrees, at the outwardly stepped portion 43, as compared to a remainder of the grooves 30. The increased depth of the grooves 30 at the outwardly stepped portion 43, measured from the lands 42, can generally be seen by comparing FIG. 3B to FIG. 4. The groove depth at the outwardly stepped portion 43, identified as $DP_1$ (see FIG. 4) is greater than the groove depth at the groove entrance 32, identified as $DP_2$ (see FIG. 3B). In one example, a can measure between approximately 40 to 80 degrees and preferably about 44 to 62 degrees. In one example, the groove depth $DP_1$ (see FIG. 4) at the outwardly stepped portion 43 can be about twice as much as the groove depth $DP_2$ (see FIG. 3B) taken at the groove entrance 32. As such, the thickness of the land 42 at the outwardly stepped portion 43, identified as $T_1$ (see FIG. 4) is greater than the thickness of the land 42 at the groove entrance 32, identified as $T_2$ (see FIG. 3B). While the thickness at the grooves 30 below the outwardly stepped portion 43, identified as $W_1$ (see FIG. 4) is equal to the thickness at the grooves 30 below the groove entrance 32, identified as $W_2$ (see FIG. 3B).

The pair of grooves 30 of the finish 10 each define a debossed (grooved) threaded profile around the annular sidewall 18. When compared to traditional injection molded finishes having an embossed (raised) threaded profile, the finish 10 of the present disclosure may represent a material savings of about 15% to about 20% of the overall container weight and more specifically about 50%, in weight, of traditional injection molded finishes. The present disclosure is particularly useful in hot-fill applications where thicker, heavier finishes have been required to withstand the heat generated from hot-fill processes thereby allowing for traditional opening diameters and finish wall thicknesses to be maintained while significantly light weighting the container. Thus, the disclosed finish 10 is capable of withstanding the rigors associated with hot-fill processes, resulting in the same or less distortion as is found in traditional container designs having thicker, heavier finishes.

In another advantage over traditional threaded finish containers, a finish 10 having grooves 30 is more comfortable for a user's mouth to engage and therefore drink from. In this way, a user's mouth can rest more comfortably on a finish free of projecting threads. Furthermore, it is easier for a user to form a seal between their mouth and the finish 10 having grooves 30 as compared to a finish having projecting threads.

A plastic container may be designed to retain a commodity during a thermal process, typically a hot-fill process. For hot-fill bottling applications, bottlers generally fill the container with a liquid or product at an elevated temperature between approximately 155° F. to 205° F. (approximately 68° C. to 96° C.) and seal the container at the finish 10 with the closure member or cap 12 before cooling. In addition, the plastic container may be suitable for other high-temperature pasteurization or retort filling processes or other thermal processes as well.

Figure 3A:
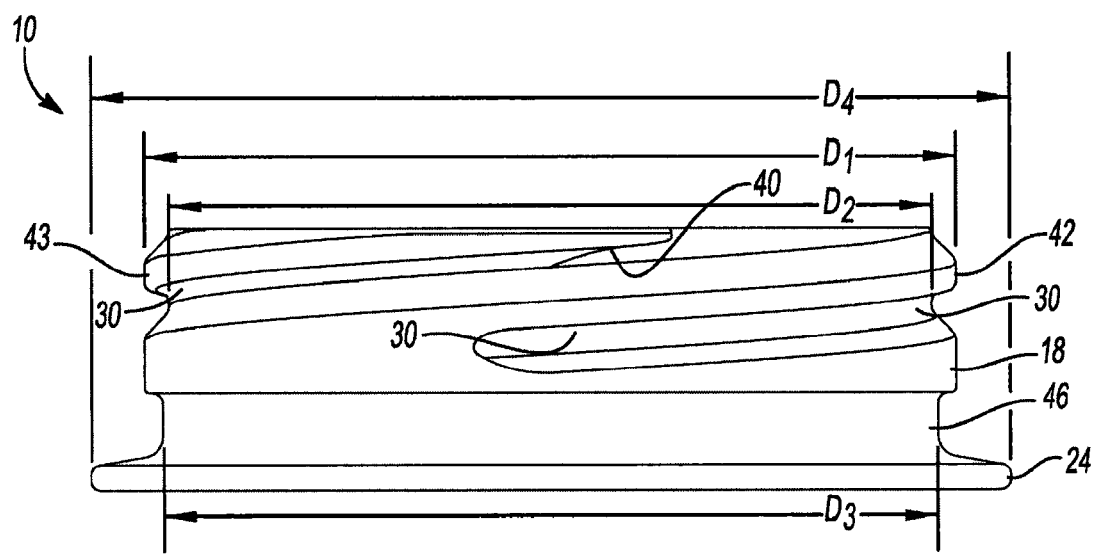
FIG. 3A is a side view of the finish of FIG. 1.
Figure 3B:
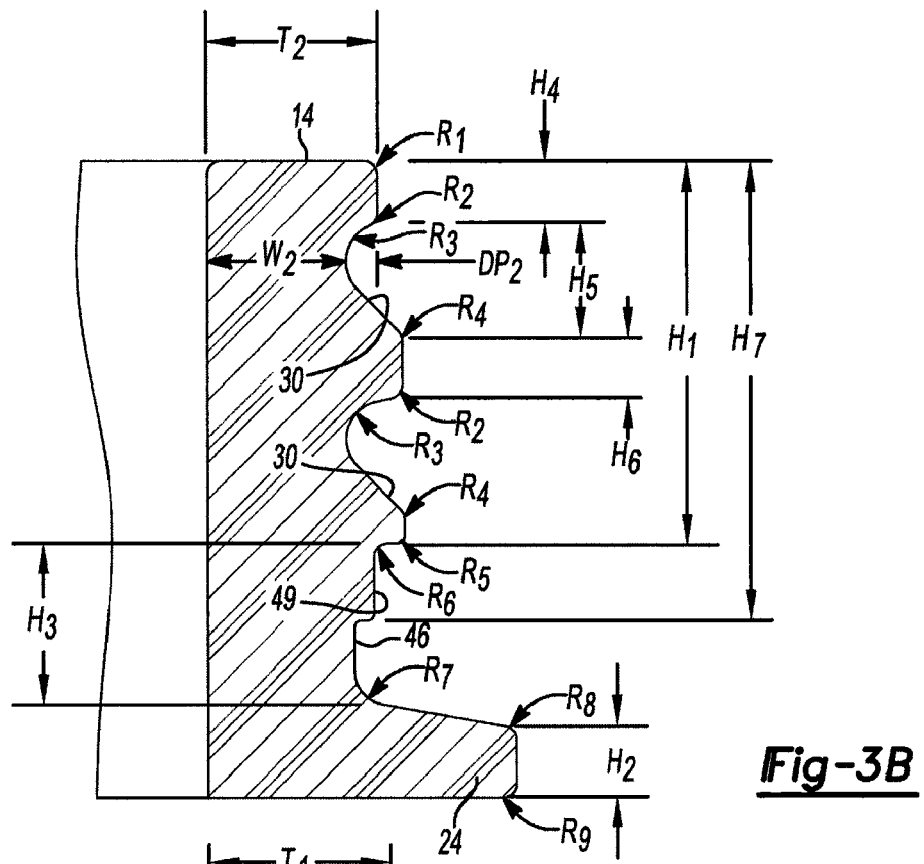
FIG. 3B is a sectional view of the finish taken along line 3B-3B of FIG. 2.
Figure 4:
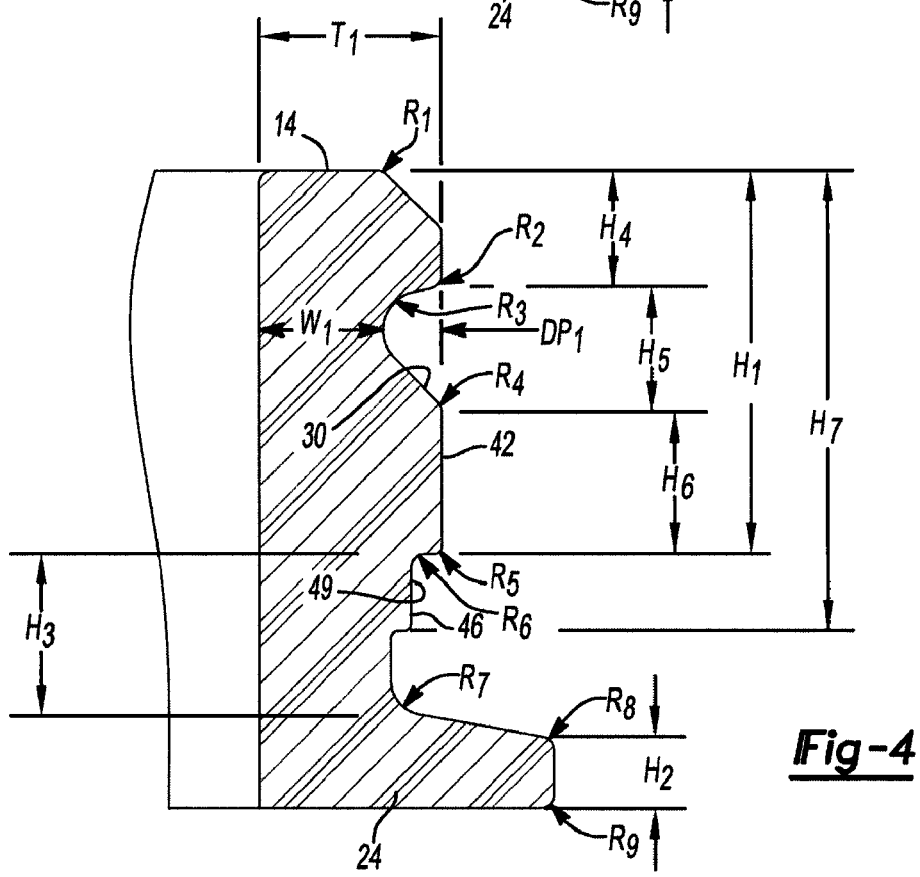
FIG. 4 is a sectional view of the finish taken along line 4-4 of FIG. 2.
Figure 5:
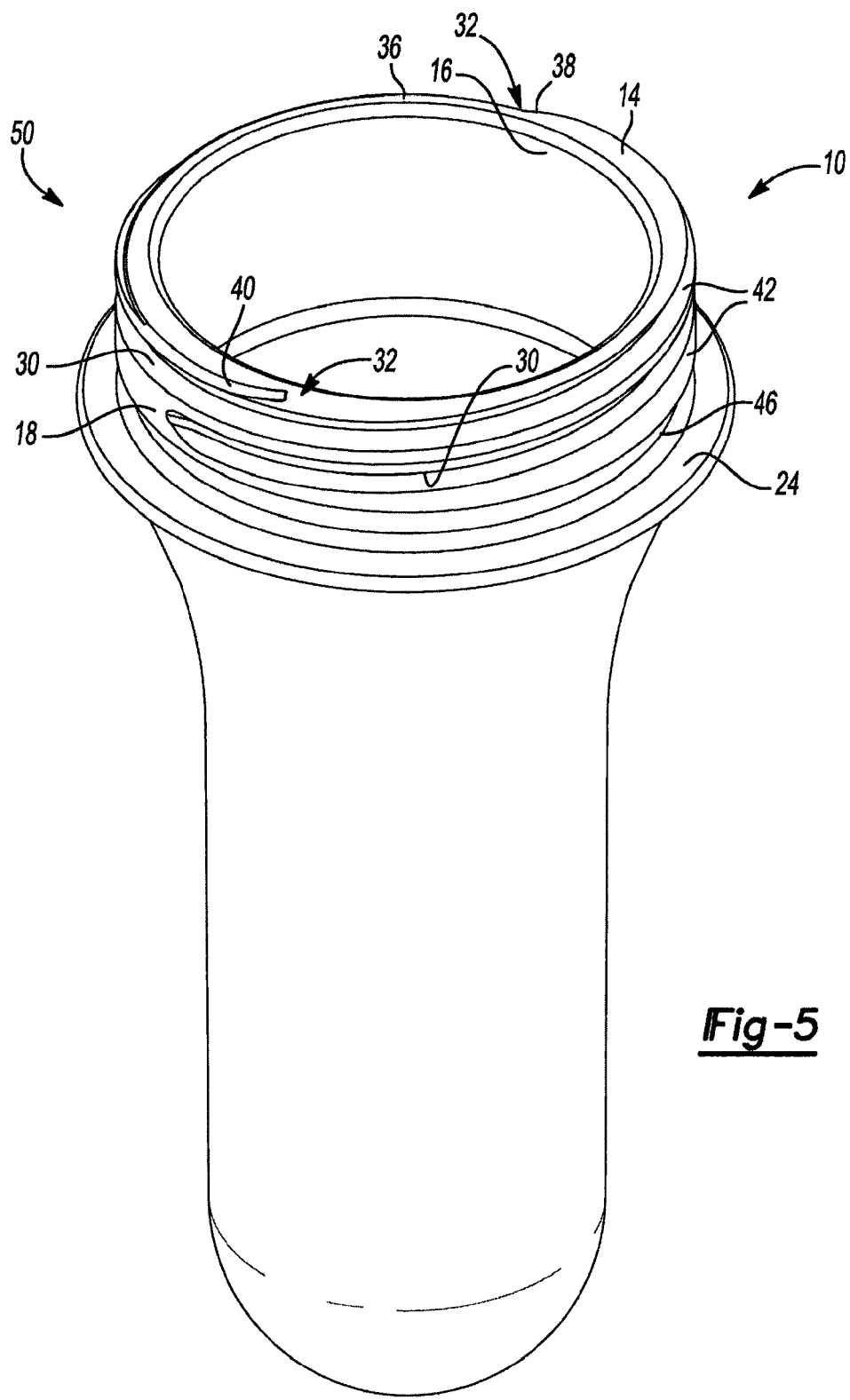
FIG. 5 is a perspective view of a preform used for construction of an exemplary plastic container having the finish of FIG. 1.
Figure 6:
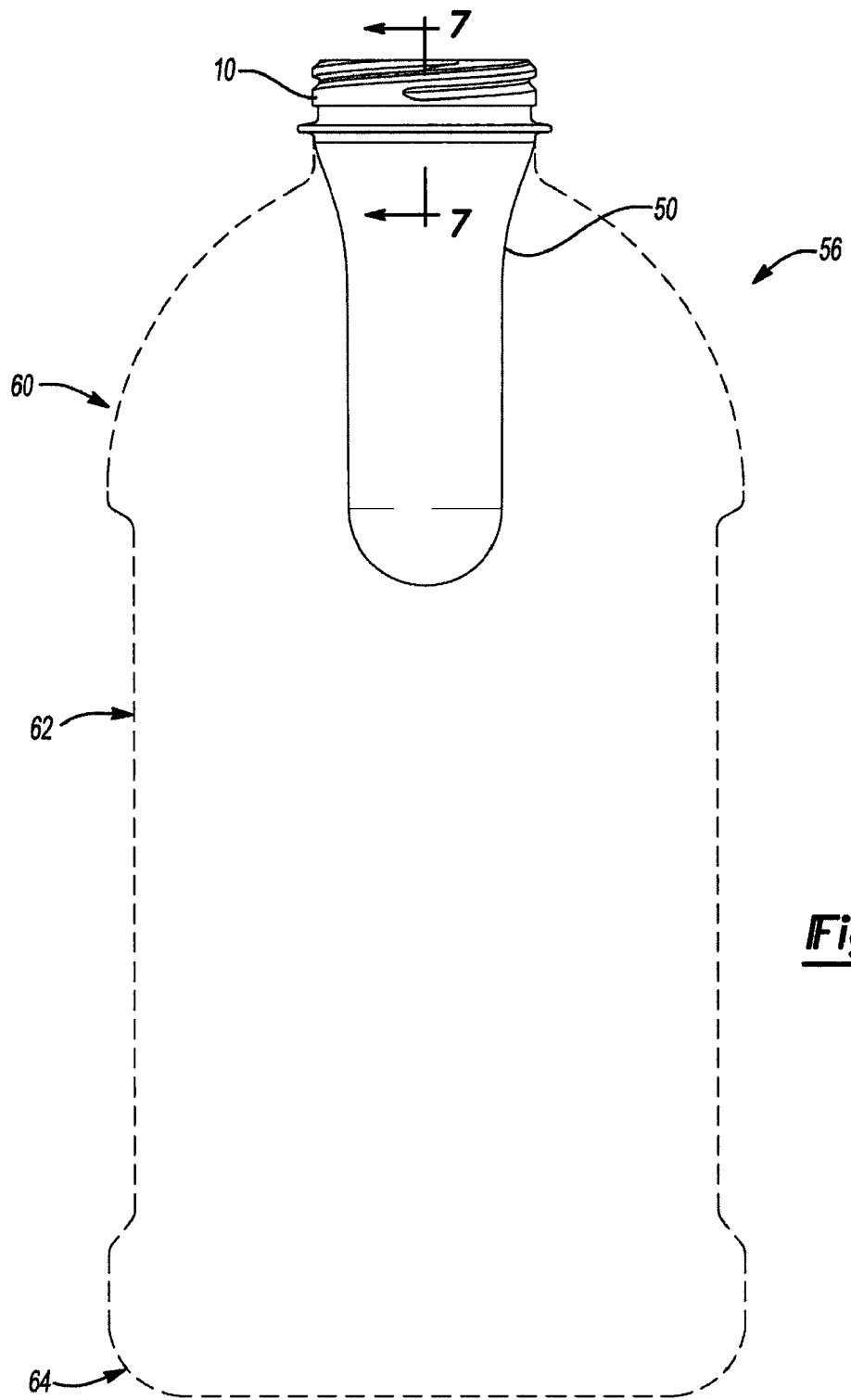
FIG. 6 is a side view of the preform of FIG. 5 shown with an exemplary molded container in phantom.

Turning now to FIGS. 3A, 3B, and 4, exemplary dimensions for the finish 10 will be described. It is appreciated that other dimensions may be used. A diameter $D_1$ of the finish 10 taken at the lands 42 of the annular sidewall 18 may be 39.24 mm (1.55 inches). A diameter $D_2$ of the finish 10 taken at the grooves 30 of the annular sidewall 18 may be 36.86 mm (1.45 inches). Accordingly, the diameter $D_2$ may be at least 1 mm (0.04 inch) less than the diameter $D_1$. A diameter $D_3$ of the finish 10 taken at the radial channel 46 may be 37.11 mm (1.46 inches). Similarly, the diameter $D_3$ may be at least 1 mm (0.04 inch) less than the diameter $D_1$. As such, the diameter $D_2$ and the diameter $D_3$ may be less than the diameter $D_1$. A diameter $D_4$ of the finish 10 taken at the support ring 24 may be 43.82 mm (1.73 inches). A diameter $D_5$ may be 37.92 mm (1.49 inches). As a result of the reduction in the cap diameter, the diameter $D_4$ is similarly reduced. A height $H_1$ taken from the top 14 to the beginning of the radial channel 46 may be 7.89 mm (0.31 inch). A height $H_2$ of the support ring 24 may be 1.43 mm (0.06 inch). A height $H_3$ of the radial channel 46 may be 3.59 mm (0.14 inch). A height $H_4$ taken from the top 14 to the first groove 30 at the completion of the ramp 40 may be 1.25 mm (0.05 inch). A height $H_5$, or a height of the groove 30, may be 3.57 mm (0.14 inch). A height $H_6$, or a height of the land 42, may be 1.24 mm (0.05 inch). A height $H_7$ taken from the top 14 to the stepped portion 49 may be 9.46 mm (0.37 inch). The groove depth $DP_1$ at the outwardly stepped portion 43 may be 1.2 mm (0.047 inch). The groove depth $DP_2$ at the groove entrance 32 may be 0.61 mm (0.024 inch). The groove depth $DP_1$ at the outwardly stepped portion 43 may not be greater than about 50% to about 60% of the thickness of the land 42 at the outwardly stepped portion 43, identified as $T_1$, measured from the outwardly stepped portion 43 to the inner diameter of the opening 16.

With continued reference to FIG. 4, various radii will now be listed with exemplary dimensions. $R_1$, $R_2$, $R_4$ and $R_5$ may be 0.25 mm (0.01 inch). $R_3$ may be 0.76 mm (0.03 inch). $R_6$ may be 0.15 mm (0.01 inch). $R_7$ may be 0.76 mm (0.03 inch). $R_8$ may be 0.25 mm (0.01 inch). $R_9$ may be 0.51 mm (0.02 inch). As such, a minimum dimension for $R_1$, $R_2$, $R_4$, $R_5$, $R_6$, $R_7$ and $R_9$ may be 0.1 mm (0.004 inch). Again, it is appreciated that other dimensions may be used. However, the above-described dimensions provide the closure member or cap 12 with good spin capabilities when engaging the grooves 30.

Turning now to FIGS. 5-8, a preform 50 used to mold an exemplary container having the finish 10 will be described. The plastic container of the present teachings is a blow molded, biaxially oriented container with a unitary construction from a single or multi-layer material. A well-known stretch-molding, heat-setting process for making hot-fillable plastic containers generally involves the manufacture of the preform 50 through injection molding of a polyester material, such as polyethylene terephthalate (PET), having a shape well known to those skilled in the art similar to a test-tube with a generally cylindrical cross section and a length typically approximately fifty percent (50%) that of the resultant container height. A machine (not illustrated) places the preform 50 heated to a temperature between approximately 190° F. to 250° F. (approximately 88° C. to 121° C.) into a mold cavity (not illustrated) having a shape similar to the resultant plastic container.

The mold cavity (not illustrated) may be heated to a temperature between approximately 250° F. to 350° F. (approximately 121° C. to 177° C.). A stretch rod apparatus (not illustrated) stretches or extends the heated preform 50 within the mold cavity to a length approximately that of the resultant container thereby molecularly orienting the polyester material in an axial direction generally corresponding with a central longitudinal axis of the resultant container. While the stretch rod extends the preform 50, air having a pressure between 300 PSI to 600 PSI (2.07 MPa to 4.14 MPa) assists in extending the preform 50 in the axial direction and in expanding the preform 50 in a circumferential or hoop direction thereby substantially conforming the polyester material to the shape of the mold cavity and further molecularly orienting the polyester material in a direction generally perpendicular to the axial direction, thus establishing the biaxial molecular orientation of the polyester material in most of the container. Typically, material within the finish 10 and a sub-portion of the base are not substantially molecularly oriented. The pressurized air holds the mostly biaxial molecularly oriented polyester material against the mold cavity for a period of approximately two (2) to five (5) seconds before removal of the container from the mold cavity.

Alternatively, other manufacturing methods using other conventional materials including, for example, polypropylene, high density polyethylene, polyethylene naphthalate (PEN), a PET/PEN blend or copolymer, and various multi-layer structures may be suitable for the manufacture of plastic containers. Those having ordinary skill in the art will readily know and understand plastic container manufacturing method alternatives.

The preform 50 may be defined in terms of complementary features of a finished container. For exemplary purposes, a formed plastic container 56 is shown in phantom in FIG. 6. As such, the plastic container 56 may include a shoulder region 60. The shoulder region 60 merges into and provides a transition between the finish 10 and a sidewall portion 62. The sidewall portion 62 extends downward from the shoulder region 60 to a base 64. The base 64 functions to close off the bottom portion of the plastic container 56 and, together with the finish 10, the shoulder region 60, and the sidewall portion 62, to retain the commodity. The specific construction of the shoulder region 60, the sidewall portion 62 and the base 64 are merely exemplary and may vary according to particular applications. The support ring 24 may be used to carry or orient the preform 50 through and at various stages of manufacture. For example, the preform 50 may be carried by the support ring 24, the support ring 24 may be used to aid in positioning the preform 50 in the mold, or an end consumer may use the support ring 24 to carry the plastic container 56 once manufactured.

Figure 7:
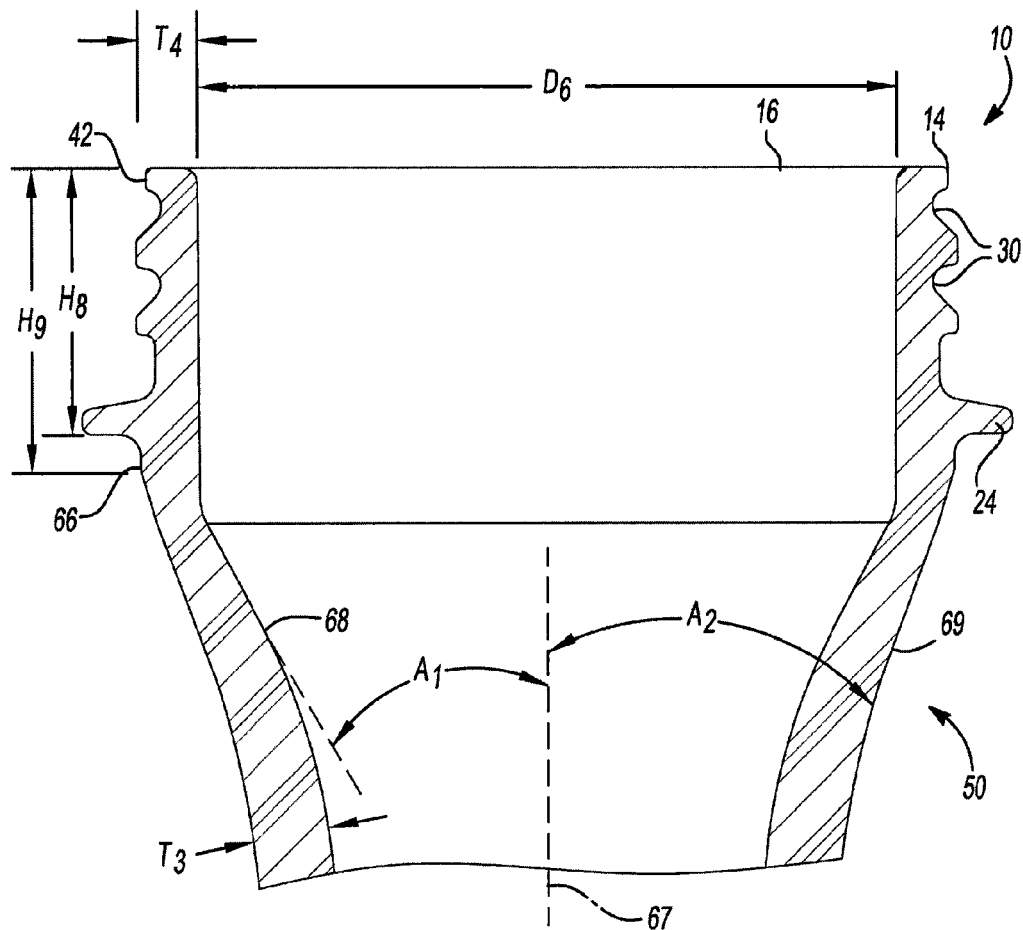
FIG. 7 is a sectional view of the preform taken along line 7-7 of FIG. 6.
Figure 8:
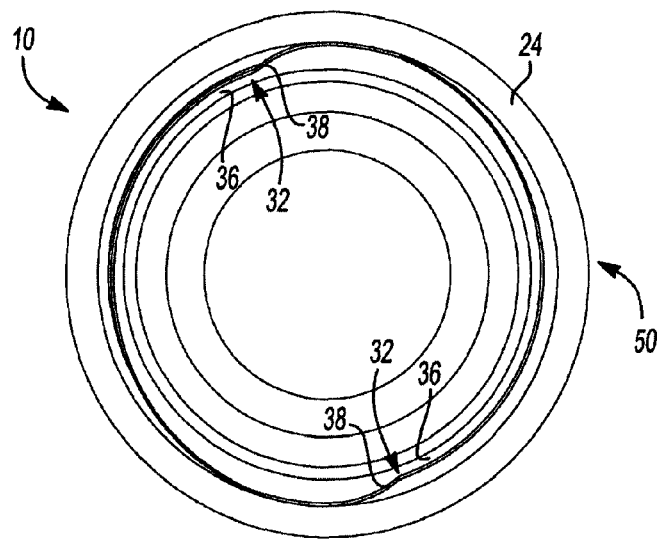
FIG. 8 is a top plan view of the preform of FIG. 5.

With specific reference now to FIGS. 7 and 8, exemplary dimensions for the preform 50 will be described. It is appreciated that the finish 10 of the preform 50 is equivalent to the finish 10 as described in FIGS. 1-4. As such, similar reference numerals will be used to designate like components. An inner diameter $D_6$ of the opening 16 may be 33.67 mm (1.33 inches). A height $H_8$ taken from the top 14 of the finish 10 to the bottom of the support ring 24 may be 13.50 mm (0.53 inch). A height $H_9$ taken from the top 14 of the finish 10 to an onset 66 of the preform 50 shoulder region may be 14.97 mm (0.59 inch). A wall thickness $T_3$ taken at the preform 50 shoulder region may be 3.62 mm (0.14 inch). A wall thickness $T_4$ taken from land 42 to the inner diameter of the opening 16 may be 2.33 mm (0.092 inch). An angle $A_1$ taken from a longitudinal centerline 67 to an inner wall surface 68 may be 27 degrees. An angle $A_2$ taken from the longitudinal centerline 67 to an outer wall surface 69 may be 20 degrees.

Figure 9:
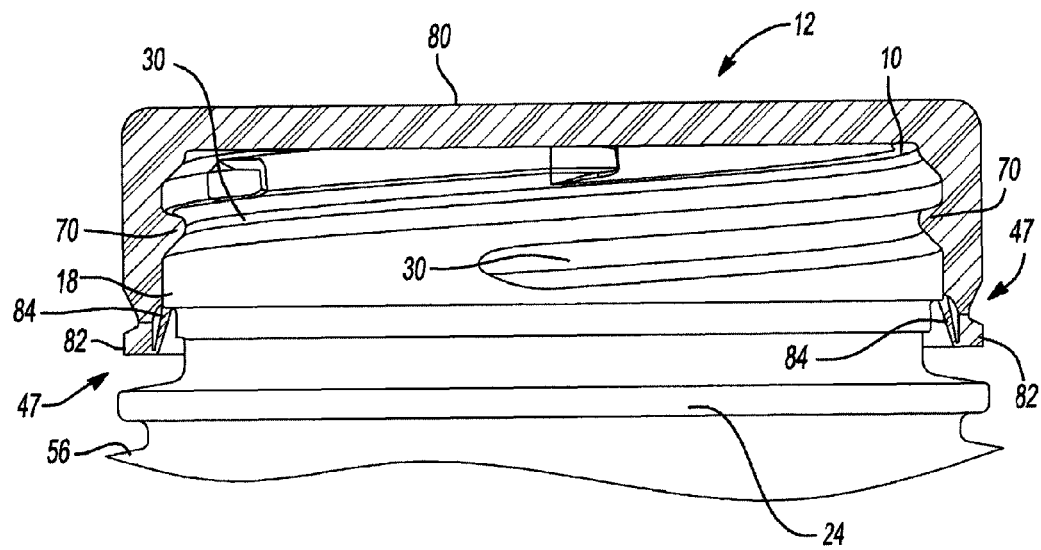
FIG. 9 is a sectional view of a closure member or cap having a tamper-evidence band and constructed in accordance with the teachings of the present disclosure, the closure member or cap is shown assembled onto the container finish shown in FIG. 1.

With reference to FIG. 9, the closure member or cap 12 is shown engaged to the finish 10 in a closed or assembled position. In the assembled position, the closure member or cap 12 engages the finish 10 to preferably provide a hermetical seal to the plastic container 56. The closure member or cap 12 is preferably of a plastic or metal material suitable for subsequent thermal processing, including high temperature pasteurization and retort. According to the present teachings, the closure member or cap 12 may define raised, outwardly extending threads 70 for rotatably engaging the grooves 30 of the finish 10. In the exemplary finish 10, a two lead configuration is shown. As such, a pair of threads 70 defined on the closure member or cap 12 is adapted to be received by the complementary pair of grooves 30. While two threads 70 are shown in the sectional view of FIG. 9, it is appreciated that one or more than two threads may be provided.

To initiate gripping of the threads 70 within the respective grooves 30, the closure member or cap 12 may be placed on the top 14 and rotated until both leads of threads 70 are accepted at the groove entrance 32. The ramp 40 (FIG. 1) progressively directs the respective threads 70 within the grooves 30 as the closure member or cap 12 is rotated in a clockwise direction. As explained above, each of the grooves 30 are defined around approximately 180 degrees to approximately 220 degrees of the annular sidewall 18. To rotate the closure member or cap 12 into a sealed position with the finish 10, the closure member or cap 12 may not need to rotate the entire approximately 180 degrees to approximately 220 degrees. In one example, the threads 70 of the closure member or cap 12 may rotate approximately 160 degrees to approximately 200 degrees around the grooves 30 to attain a sealed position. In other words, each of the embossed (raised) threads 70 of the closure member or cap 12 may be lesser in length than each of the respective grooves 30 of the finish 10. Additionally, the threads 70 of the closure member or cap 12 may be longer than or the same in length as each of the respective grooves 30 of the finish 10 in order to orient the closure member or cap 12 in relation to the plastic container 56. The finish 10, having debossed (inward) grooves 30 of the current disclosure, enables use of a closure member or cap 12 being shorter in height and smaller in diameter than caps currently used with traditional finishes of the same diameter having embossed (raised) threads. In one example, an outer diameter of the closure member or cap 12 can be reduced to about 41 mm (1.61 inches) as compared to a 43 mm (1.69 inches) outer diameter required for an equivalent conventional cap having grooves. Furthermore, as illustrated in FIG. 9, the outer diameter of the closure member or cap 12 can be substantially equivalent to an outer diameter defined at the support ring 24. This represents a significant weight savings, as less material is required for the closure member or cap 12. Accordingly, the finish 10 provides the plastic container 56 with the ability to retain the closure member or cap 12, and withstand the associated application torque while also providing easy removal of the closure member or cap 12.

The closure member or cap 12 is shown with the TE band 47. The closure member or cap 12 can also generally include a cover 80 at an upper end. The TE band 47 is further defined by a band body 82 and a flap 84 extending therefrom. The flap 84 extends generally inboard of the band body 82. The TE band 47 of the closure member or cap 12 is designed to ride over the annular sidewall 18 of the finish 10 in a forward (downward) direction when the closure member or cap 12 is initially applied to the plastic container 56. When the closure member or cap 12 is initially unscrewed (moved upward), the flap 84 engages the annular sidewall 18 and thereafter breaks away the TE band 47 from the closure member or cap 12. The prevention of the TE band 47 moving back up on the finish 10 when the closure member or cap 12 is removed creates the necessary engagement interface and force that effectively removes the TE band 47 from the closure member or cap 12, leaving it on the container finish 10.

Figure 10:
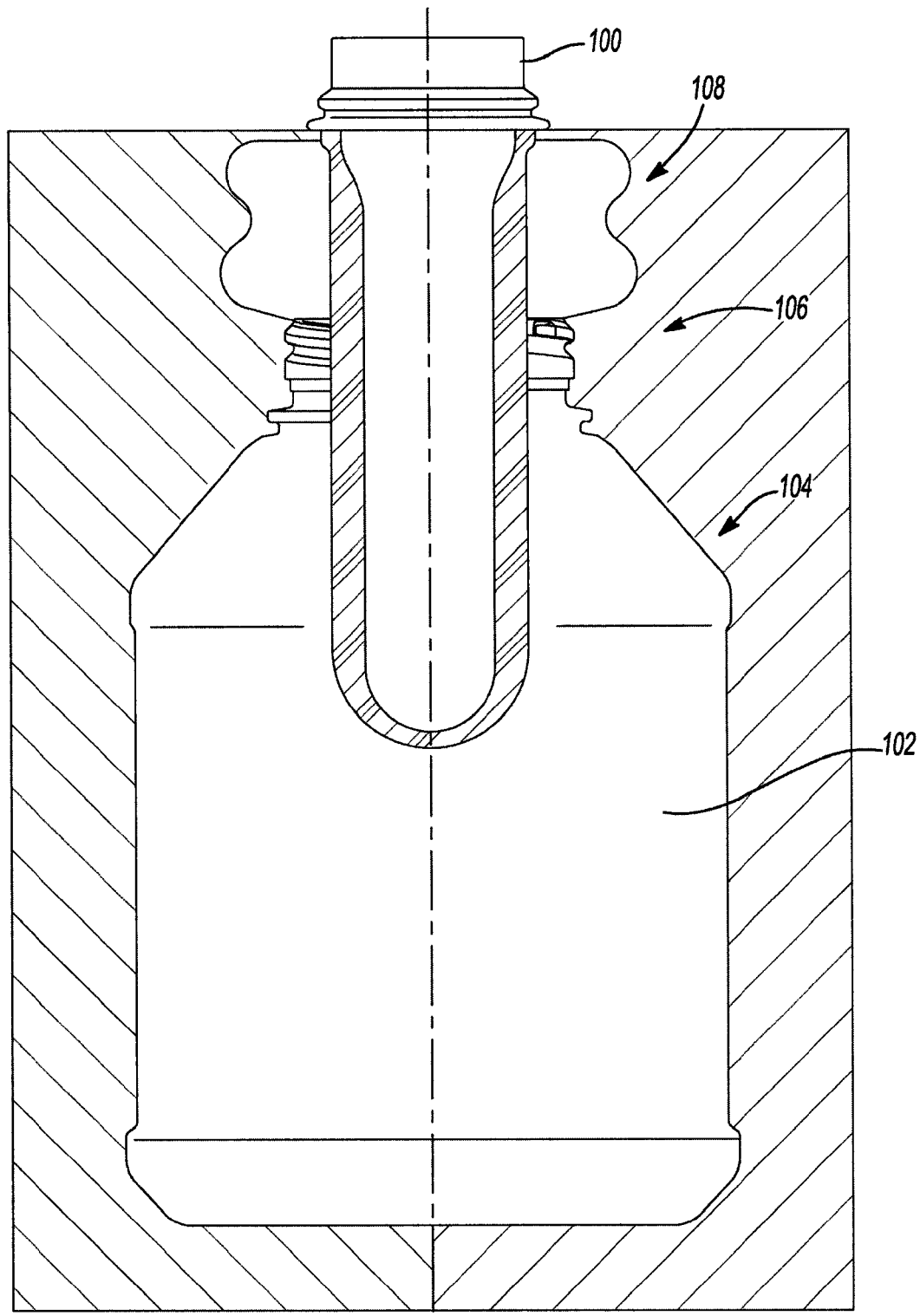
FIG. 10 is a sectional view of an exemplary mold cavity used during formation of a blown plastic container according to the present teachings.
Figure 11:
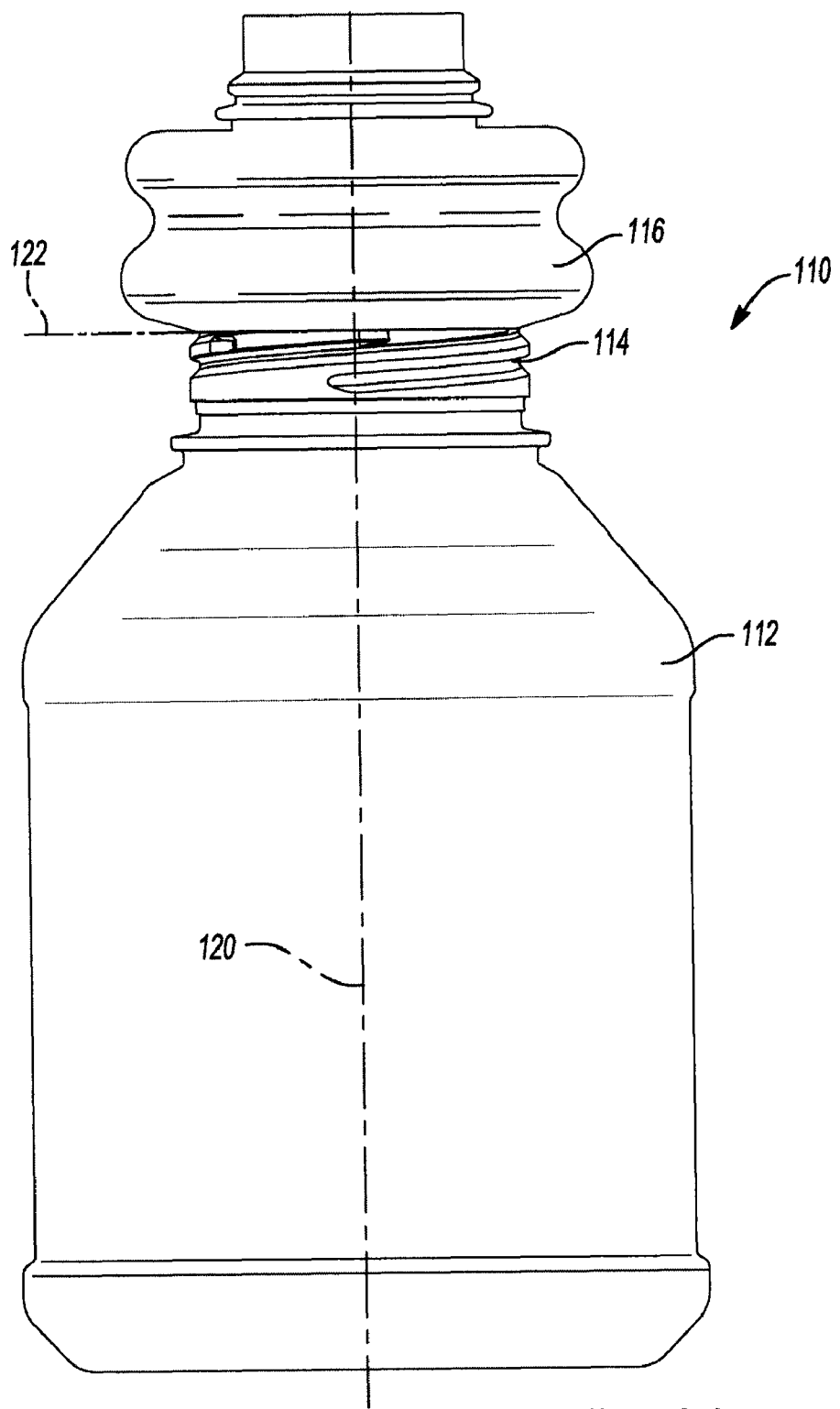
FIG. 11 is a side elevational view of an intermediate container formed by the mold cavity of FIG. 10.

Turning now to FIG. 10, an exemplary method of forming an intermediate container according to additional features will be described. In this example, the entire container, including the finish is blown in one process. At the outset, a preform 100 may be placed into a mold cavity 102. In general, the mold cavity 102 has an interior surface corresponding to a desired outer profile of the blown container. More specifically, the mold cavity 102 according to the present teachings defines a body forming region 104, a finish forming region 106 and a moil forming region 108. The resultant structure, hereinafter referred to as an intermediate container 110, as illustrated in FIG. 11, generally includes a body 112, a finish 114 and a moil 116.

In one example, a machine (not illustrated) places the preform 100 heated to a temperature between approximately 190° F. to 250° F. (approximately 88° C. to 121° C.) into the mold cavity 102. The mold cavity 102 may be heated to a temperature between approximately 250° F. to 350° F. (approximately 121° C. to 177° C.). A stretch rod apparatus (not illustrated) stretches or extends the heated preform 100 within the mold cavity 102 to a length approximately that of the intermediate container 110, thereby molecularly orienting the polyester material in an axial direction generally corresponding with a central longitudinal axis 120 of the intermediate container 110. While the stretch rod extends the preform 100, air having a pressure between 300 PSI to 600 PSI (2.07 MPa to 4.14 MPa) assists in extending the preform 100 in the axial direction and in expanding the preform 100 in a circumferential or hoop direction thereby substantially conforming the polyester material to the shape of the mold cavity 102 and further molecularly orienting the polyester material in a direction generally perpendicular to the axial direction, thus establishing the biaxial molecular orientation of the polyester material in most of the intermediate container 110. The pressurized air holds the mostly biaxial molecularly oriented polyester material against the mold cavity 102 for a period of approximately two (2) to five (5) seconds before removal of the intermediate container 110 from the mold cavity 102.

In another example, a machine (not illustrated) places the preform 100 heated to a temperature between approximately 185° F. to 239° F. (approximately 85° C. to 115° C.) into the mold cavity 102. The mold cavity 102 may be chilled to a temperature between approximately 32° F. to 75° F. (approximately 0° C. to 24° C.). A stretch rod apparatus (not illustrated) stretches or extends the heated preform 100 within the mold cavity 102 to a length approximately that of the intermediate container 110, thereby molecularly orienting the polyester material in an axial direction generally corresponding with the central longitudinal axis 120 of the intermediate container 110. While the stretch rod extends the preform 100, air having a pressure between 300 PSI to 600 PSI (2.07 MPa to 4.14 MPa) assists in extending the preform 100 in the axial direction and in expanding the preform 100 in a circumferential or hoop direction thereby substantially conforming the polyester material to the shape of the mold cavity 102 and further molecularly orienting the polyester material in a direction generally perpendicular to the axial direction, thus establishing the biaxial molecular orientation of the polyester material in most of the intermediate container 110. The pressurized air holds the mostly biaxial molecularly oriented polyester material against the mold cavity 102 for a period of approximately two (2) to five (5) seconds before removal of the intermediate container 110 from the mold cavity 102. This process is utilized to produce containers suitable for filling with product under ambient conditions or cold temperatures.

Alternatively, other manufacturing methods using other conventional materials including, for example, polypropylene, high density polyethylene, polyethylene naphthalate (PEN), a PET/PEN blend or copolymer, and various multilayer structures may be suitable for the manufacture of the intermediate container 110. Those having ordinary skill in the art will readily know and understand container manufacturing method alternatives.

Once the intermediate container 110 has been formed, the intermediate container 110 may be removed from the mold cavity 102. As can be appreciated, the intermediate container 110 defines the resultant container and the moil 116 prior to formation of the opening 16 (FIG. 1). An intersection between the finish 114 and the moil 116 defines a cutting plane 122 (FIG. 11). The moil 116 is subsequently severed from the finish 114 at the cutting plane 122. The severing process may be any suitable cutting procedure that removes the moil 116 and creates the opening 16.

While the above description constitutes the present disclosure, it will be appreciated that the disclosure is susceptible to modification, variation and change without departing from the proper scope and fair meaning of the accompanying claims.

What is claimed is:

1. A plastic container having an upper portion and a body portion extending from said upper portion to a base, said base closing off an end of said container; said upper portion, said body portion and said base cooperating to define a receptacle chamber within said container into which product can be filled, said plastic container operable to attach to a closure member with an embossed thread, said plastic container comprising:
   a finish formed in said upper portion defining an opening into the container and a longitudinal axis; and
   a radial sidewall of said finish defined in part by an outwardly sweeping radial lip that extends about the longitudinal axis to transition into an outwardly stepped portion, the outwardly stepped portion protruding radially further from the longitudinal axis than the outwardly sweeping radial lip, the radial sidewall also defined by a land, the radial sidewall further defined by at least one groove, said at least one groove sloping gradually downward from a groove entrance along said finish, said at least one groove operable to threadably receive the embossed thread of the closure member, a first portion of the at least one groove being adjacent the groove entrance and being defined between the outwardly sweeping radial lip and the land, the first portion transitioning into a second portion of the at least one groove after a predetermined amount of groove travel around said finish, the second portion being defined between the outwardly stepped portion and the land, wherein the first portion has a first groove depth measured perpendicular to the longitudinal axis from the outwardly sweeping radial lip and the second portion has a second groove depth measured perpendicular to the longitudinal axis from the outwardly stepped portion, wherein said second groove depth is greater than said first groove depth.

2. The plastic container of claim 1 wherein said second groove depth is about twice as great as a said first groove depth.

3. The plastic container of claim 2 wherein said second groove depth is not greater than about 50% to about 60% of a wall thickness measured from an inner diameter of said opening to an outer diameter of said outwardly stepped portion.

4. The plastic container of claim 1 wherein each of said at least one groove initiates at said groove entrance and slopes gradually downward about 180 degrees to about 220 degrees around said radial sidewall.

5. The plastic container of claim 4 wherein said groove entrance is generally defined at an intersection between an inward sweeping radial lip and said outward sweeping radial lip, wherein said inward sweeping radial lip defines an arcuate path having a decreasing radius in a clockwise direction and wherein said outward sweeping radial lip defines an arcuate path having an increasing radius in a clockwise direction.

6. The plastic container of claim 4 wherein said predetermined amount of groove travel is between about 40 degrees and about 80 degrees around said radial sidewall from said groove entrance.

7. The plastic container of claim 6 wherein said predetermined amount of groove travel is about 44 degrees to about 62 degrees.

8. A plastic container assembly comprising:
a plastic container with a longitudinal axis comprising:
a finish having a first radial sidewall and formed at an opening into said container;
an outwardly sweeping radial lip formed in said first radial sidewall, the outwardly sweeping radial lip extending about the longitudinal axis to transition into an outwardly stepped portion, the outwardly stepped portion protruding radially further from the longitudinal axis than the outwardly sweeping radial lip;
a land formed in said first radial sidewall; and
at least one groove formed in said first radial sidewall, said at least one groove sloping gradually away from a groove entrance along said finish, a first portion of the at least one groove being adjacent the groove entrance and being defined between the outwardly sweeping radial lip and the land, the first portion transitioning into a second portion of the at least one groove after a predetermined amount of groove travel around said finish, the second portion being defined between the outwardly stepped portion and the land, wherein the first portion has a first groove depth measured perpendicular to the longitudinal axis from the outwardly sweeping radial lip and the second portion having a second groove depth measured perpendicular to the longitudinal axis from the outwardly stepped portion, said first groove depth being less than said second groove depth; and
a closure member adapted to selectively mate with said first radial sidewall of said container, said closure member comprising:
a lower portion defining a closure opening;
an upper portion defining a cover; and
a second radial sidewall extending between said lower portion and said upper portion, said second radial sidewall having an inner surface defined in part by at least one embossed thread formed thereon, said at least one embossed thread adapted to be received within and cooperatively engage said at least one groove in an assembled position.

9. The plastic container assembly of claim 8 wherein said second radial sidewall further includes a tamper-evidence band.

10. The plastic container assembly of claim 9 wherein each of said at least one groove initiates at the groove entrance and slopes gradually downward about 180 degrees to about 220 degrees around said first radial sidewall.

11. The plastic container assembly of claim 8 wherein each of said at least one thread initiates at a thread entrance and slopes gradually toward said cover about 160 degrees to about 200 degrees around said second radial sidewall.

12. The plastic container assembly of claim 8 wherein said second groove depth is not greater than about 50% to about 60% of a wall thickness measured from an inner diameter of said opening to an outer diameter of the outwardly stepped portion.

13. The plastic container assembly of claim 8 wherein said closure member is formed of one of a plastic and a metal material suitable for thermal processing.

14. The plastic container assembly of claim 8 wherein said first groove depth is about half of said second groove depth.

15. The plastic container assembly of claim 8 wherein said predetermined distance is between about 40 degrees and about 80 degrees around said first radial sidewall from said groove entrance.

16. A preform adapted to be molded into a plastic container, said preform comprising:
an upper portion having a mouth corresponding to an opening into the container, the upper portion defining a longitudinal axis; and
a radial sidewall of said upper portion defined in part by an outwardly sweeping radial lip that extends about the longitudinal axis to transition into an outwardly stepped portion, the outwardly stepped portion protruding radially further from the longitudinal axis than the outwardly sweeping radial lip, the radial sidewall also defined by a land, the radial sidewall further defined by at least one groove, said at least one groove sloping gradually downward from a groove entrance along said radial Sidewall, a first portion of the at least one groove being adjacent the groove entrance and being defined between the outwardly sweeping radial lip and the land, the first portion transitioning into a second portion of the at least one groove after a predetermined amount of groove travel around said longitudinal axis, the second portion being defined between the outwardly stepped portion and the land, wherein the first portion has a first groove depth measured perpendicular to the longitudinal axis from the outwardly sweeping radial lip and the second portion has a second groove depth measured perpendicular to the longitudinal axis from the outwardly stepped portion, wherein said second groove depth is greater than said first groove depth.

17. The preform of claim 16 wherein said second groove depth is not greater than about 50% to about 60% of a wall thickness measured from an inner diameter of said opening to an outer diameter of the outwardly stepped portion.

18. The preform of claim 16 wherein each of said at least one groove initiates at the groove entrance and slopes gradually downward about 180 degrees to about 220 degrees around said radial sidewall.

19. The preform of claim 18 wherein said groove entrance is generally defined at an intersection between an inward sweeping radial lip and the outward sweeping radial lip, wherein said inward sweeping radial lip defines an arcuate path having a decreasing radius in a clockwise direction and wherein said outward sweeping radial lip defines an arcuate path having an increasing radius in a clockwise direction.

20. The preform of claim 18 wherein said predetermined amount of groove travel is between about 40 degrees and about 80 degrees around said radial sidewall from said groove entrance.

21. The preform of claim 16 wherein a first distance measured between an inner wall surface and an outer wall surface is greater than a second distance measured between an inner diameter of said opening and an outer diameter of each of said at least one groove.

22. The preform of claim 16 wherein a first angle measured between the longitudinal axis and an inner wall surface is less than a second angle measured between said longitudinal axis and an outer wall surface.

* * * * *

UNITED STATES PATENT AND TRADEMARK OFFICE
CERTIFICATE OF CORRECTION

PATENT NO. : 8,308,002 B2  
APPLICATION NO. : 12/648462  
DATED : November 13, 2012  
INVENTOR(S) : Michael E. Penny Page 1 of 1

It is certified that error appears in the above-identified patent and that said Letters Patent is hereby corrected as shown below:

In the Specifications:

Column 4, line 64, "first a degrees" should be --first α degrees--.

Column 5, line 4, "a can" should be --α can--.

Signed and Sealed this  
Twenty-first Day of May, 2013

Teresa Stanek Rea  
*Acting Director of the United States Patent and Trademark Office*